(12) United States Patent
Zorek, Sr. et al.

(10) Patent No.: US 7,752,495 B2
(45) Date of Patent: * Jul. 6, 2010

(54) SYSTEM AND METHOD FOR PREDICTIVE PROCESSOR FAILURE RECOVERY

(75) Inventors: Edward Victor Zorek, Sr., Cary, NC (US); Thomas James Fox, Apex, NC (US); Eric Richard Kern, Durham, NC (US); Michael Scott Rollins, Durham, NC (US); William Bradley Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/046,330

(22) Filed: Mar. 11, 2008

(65) Prior Publication Data

US 2008/0162988 A1 Jul. 3, 2008

Related U.S. Application Data

(63) Continuation of application No. 10/888,391, filed on Jul. 9, 2004, now Pat. No. 7,426,657.

(51) Int. Cl.
*G06F 11/00* (2006.01)
(52) U.S. Cl. .............................. 714/13; 714/11; 714/12; 714/47
(58) Field of Classification Search ........................ None
See application file for complete search history.

(56) References Cited

U.S. PATENT DOCUMENTS

| | | | | |
|---|---|---|---|---|
| 5,796,937 A * | 8/1998 | Kizuka | ........................ | 714/13 |
| 6,574,748 B1 * | 6/2003 | Andress et al. | ............... | 714/11 |
| 6,629,266 B1 * | 9/2003 | Harper et al. | ................. | 714/38 |
| 6,978,398 B2 * | 12/2005 | Harper et al. | ................. | 714/13 |
| 7,007,192 B2 * | 2/2006 | Yamazaki | ....................... | 714/5 |
| 2005/0015661 A1 * | 1/2005 | Vaidyanathan | ............... | 714/13 |
| 2005/0172164 A1 * | 8/2005 | Fox et al. | ....................... | 714/13 |

* cited by examiner

*Primary Examiner*—Yolanda L Wilson
(74) *Attorney, Agent, or Firm*—Cynthia Seal; Law Office of Jim Boice

(57) ABSTRACT

A system, method, and computer program product for reporting and recovering from an internal processor error in a multiprocessor system supporting system management mode. In accordance with the method of the present invention one or more replacement agents are allocated such as during system startup within the multiprocessor system. Machine specific error-reporting registers are monitored for one or more active processor agents during system operation. In response to detecting a faulty agent via the monitoring, a system management interrupt (SMI) request is issued to one or both the faulty agent and a selected replacement agent. In response to receiving the SMI request, the operating state of the faulty agent is copied to the selected replacement agent in system management mode. Operating system processing is then resumed using the replacement agent.

8 Claims, 4 Drawing Sheets

SYSTEM AND METHOD FOR PREDICTIVE PROCESSOR FAILURE RECOVERY

PRIORITY CLAIM

The present application is a continuation of U.S. patent application Ser. No. 10/888,391, filed on Jul. 9, 2004 and entitled, "System and Method for Predictive Processor Failure Recovery," the contents of which is incorporated herein by reference.

BACKGROUND OF THE INVENTION

1. Technical Field

The present invention relates generally to data processing systems and in particular to a system and method for recovering from an internal processor failure. More particularly, the present invention relates to a processor failure recovery technique applicable in a multiprocessor environment employing system management and predictive failure analysis techniques.

2. Description of the Related Art

Computer failures can result from malfunctioning disk drives, memory or processors, conflicts between hardware components, and software errors, among other things. Solutions to such failures have included, for example, Predictive Failure Analysis (PFA) which provides autonomous monitoring of specified system parameters or failure conditions to predict and issue alerts warning of actual or imminent device failures. This allows a system administrator to either hot-swap the faulty component or schedule downtime at low-impact periods for the component to be fixed or replaced.

While PFA has provided substantial gains in preventing data loss and minimal runtime interruption for disk drive systems such as RAID systems, neither PFA nor other system failure warning or recovery techniques have adequately addressed data loss and system interruption caused by internal processor failures. Since processors provide the fundamental processing functions of a system including those required for system recovery, runtime protection facilities such as PFA have been limited to issuing alerts and/or automatically resetting (rebooting) the system responsive to detected processor performance degradation.

The lack of runtime processor recovery solutions that would allow preservation of current state and unsaved data and enable the system to continue operating with minimal interruption is evident from recently proposed processor error recovery solutions. Current processor-specific PFA, for example, monitors processor-related faults such as L2 cache error corrections, and responsive to the frequency of such errors exceeding a specified threshold, a system management processor generates an alert that may then by utilized by a system administrator to schedule processor replacement as part of a maintenance cycle. Another very current example of the dearth of autonomic recovery solutions to processor failures is exemplified by U.S. Patent application Ser. No. 20040034816 A1, which discloses a computer failure recovery and notification system. The recovery described therein generally comprises use of a timer mechanism that monitors the relative activity or "heartbeat" from the operating system. The absence of the periodic heartbeat signal is interpreted by the system as a system hang or failure and the recovery action taken in response thereto is to reboot the system thus resulting in a loss of state operating data and an interruption of runtime processing. Other recently proposed solutions involve using dedicated error handling hardware in a multi-processor environment to monitor and record internal processor errors. Responsive to an error status reported for one or more of the multi-processors, the non-functional processors are disabled and, similar to the system described in U.S. Patent application Ser. No. 20040034816 A1, the recovery further includes restarting the system.

In summary, the present state of the art of systems addressing internal processor errors fails are largely either operating system reliant and/or result in the present operating state of a failing processor being lost such as via a system restart. Accordingly, there remains a need for improved processor recovery system and method that addresses these and other problems unaddressed by the prior art.

SUMMARY OF THE INVENTION

A system, method, and computer program product for reporting and recovering from an internal processor error in a multiprocessor system supporting system management mode are disclosed herein. In accordance with the method of the present invention one or more replacement agents are allocated such as during system startup within the multiprocessor system. Machine specific error-reporting registers are monitored for one or more active processor agents during system operation. In response to detecting a faulty agent via the monitoring, a system management interrupt (SMI) request is issued to one or both the faulty agent and a selected replacement agent. In response to receiving the SMI request, the operating state of the faulty agent is copied to the selected replacement agent in system management mode. Operating system processing is then resumed using the replacement agent.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
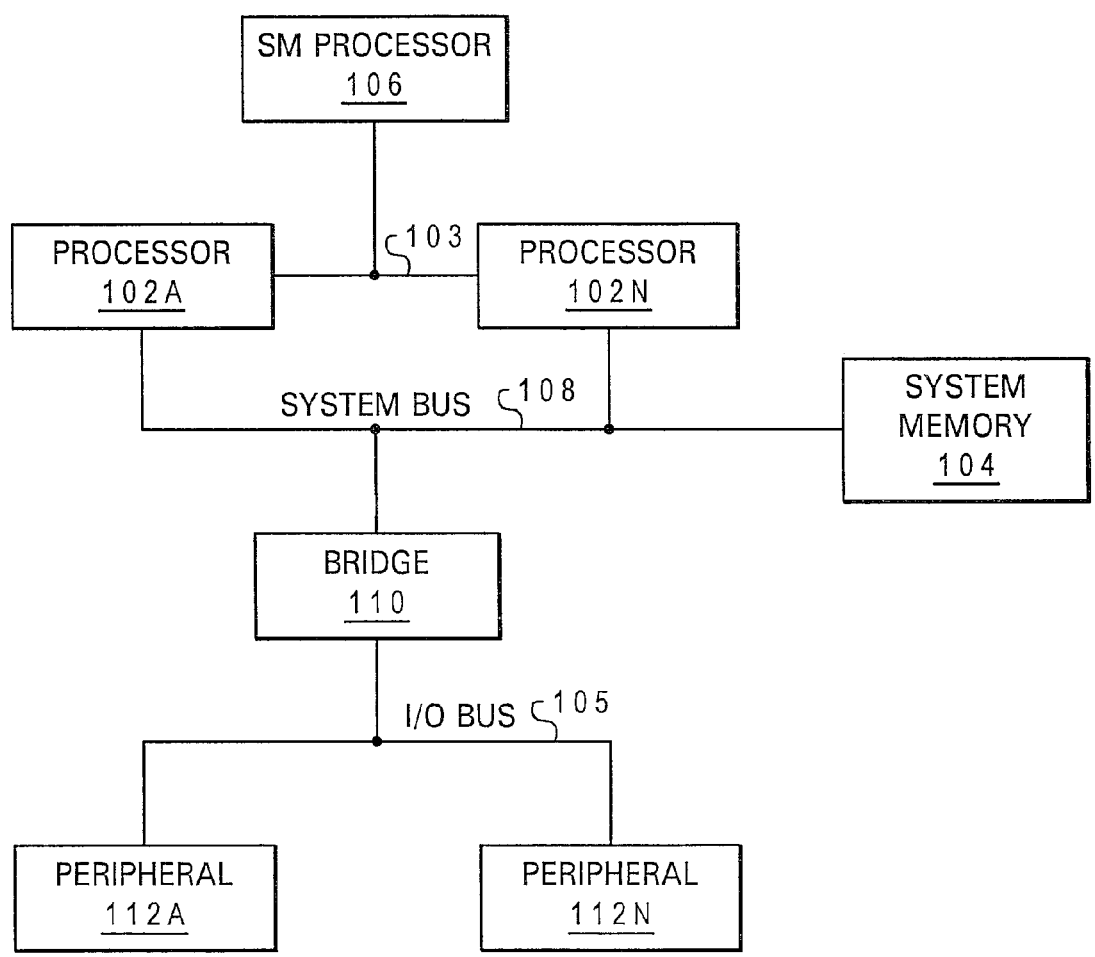
FIG. 1 is a high-level block diagram depicting a data processing system adapted for implementing processor recovery in accordance with the present invention.

The present invention is generally directed to a system, method and computer program product for handling internal processor errors in a multiprocessor system such as a high end symmetric multiprocessor (SMP) server system. More particularly, the present invention is directed to providing runtime processor recovery for a multiprocessors system having one or more physical processors or processor cores with one or more of the physical processors implementing multiple logical processors. As utilized herein a processor or processor core refers to a single physical processor while a logical processor refers to a hardware execution thread included within a multi-threaded processor. As related to the principle of invention set forth herein, the terms "processor," "processor core," and "logical processor" are generically referred to processor agents. In one embodiment, a system management interrupt (SMI) is issued responsive to a detected failure condition reported from a predictive failure analysis (PFA) facility that monitors agent-specific registers in the multi-core and/or multi-thread system. A software routine associated with the interrupt selects an available processor agent as a replacement for the failing or degraded agent. The operating or architectural state of the failing agent is copied to the selected agent which then resumes runtime processing in place of the failed agent. It is important to note that as utilized herein, references to a "failed," "failing," or "degraded" agent do not necessarily designate a present malfunction, failure, corruption, unrecoverable error, etc. Instead, and consistent with PFA convention, a "failed" or "faulty" device may indicate a device operating condition as monitored by PFA techniques indicates a degraded condition or probability of future failure such as when an error-reporting threshold has been exceeded.

As explained in further detail with reference to the figures, the present invention provides a means for predictively recovering from a processor agent failure by using system management functionality that is transparent to the operating system. In a preferred embodiment, the present invention leverages extant Predictive Failure Analysis (PFA) techniques in concert with system management (SM) functionality to provide a combined prediction and user notification mechanism combined with autonomic processor state recovery. SM functionality is employed in most current computer systems, such as those utilizing the Intel® Xeon™ line of server processors, and is generally characterized as providing a special processing mode known as system management mode (SMM). In SMM, the computer processor(s) executes instructions accessed from a completely separate address space than the standard operating mode address space in which the system memory is mapped. For a given processor within a multiprocessor system employing SMM, the physical system memory is mapped according to standard address mapping when the processor is not in system management mode and is mapped according to a system management mode address mapping when the processor is in system management mode.

System management mode is commonly used for implementing low-level control features such as power management. A common implementation of power management is to turn off power to a device when it has been idle for a specified period. As explained below, the present invention capitalizes on the operating system independence of SMM to provide a processor failure recovery mechanism that does not interrupt system runtime operations and further provides access to replacement processor agent candidates that are not recognized by many operating system architectures.

With reference now to the figures, wherein like reference numerals refer to like and corresponding parts throughout, and in particular with reference to FIG. 1, there is depicted a data processing system 100 adapted for implementing processor recovery in accordance with the present invention. While the depicted embodiment describes data processing system 100 as a symmetric multiprocessor (SMP) system, as used herein, the terms "data processing system," "computer," and the like are intended to mean essentially any type of computing device or machine that is capable of receiving, storing and running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While the invention will be described in the general context of specifically labeled electronic and program modules running within a multiprocessor type computer, those skilled in the art will recognize that the invention also may be implemented in combination with other program modules to achieve the same results. Generally, program modules include routines, programs, components, data structures, etc. that perform particular tasks or implement particular abstract data types. Moreover, those skilled in the art will appreciate that the invention may be practiced with other computer system configurations employing multiprocessor design, including hand-held devices, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Generally speaking, the present invention contemplates a system and method for handling processor internal errors in a multiprocessor system such as a high end SMP server system. With reference to FIG. 1, there is illustrated a high-level block diagram depicting a data processing system 100 adapted for implementing the method and system of the present invention. In accordance with the invention, data processing system 100 includes a set of main processors 102A through 102N (generically or collectively referred to as processor(s) 102) that are connected to a system bus 108. A common system memory 104 is accessible to each processor 102 via system bus 108. System memory 104 is typically implemented as a combination of non-volatile storage media such as read-only memory (ROM) devices and volatile storage media such as an array of dynamic random access memory (DRAM) devices. Data processing system 100 is preferably a symmetric multiprocessor system (SMP) that permits each of processors 102 substantially equal access to system memory 104 (i.e., the memory access time is substantially independent of the processor) for easily transferable task assignment.

As further depicted in FIG. 1, a bus bridge 110 provides an interface between system bus 108 and an I/O bus 105 to which one or more peripheral devices 112A through 112N are connected. I/O bus 105 is typically compliant with one of several industry standard I/O bus specifications including, for example, the Peripheral Components Interface (PCI) standard. Peripheral devices 112 may include devices such as a graphics adapter, high-speed network adapter, hard-disk controller, user I/O devices, and the like.

Data processing system 100 according to the present invention farther includes a system-management (SM) logic block 106. In the depicted embodiment, SM logic 106 is communicatively coupled to processors 102 via a service path 103 which provides access to internal processors-specific registers (not depicted). Specifically, SM logic 106 comprises PFA logic for monitoring internal processor registers such as machine specific registers (MSRs) and issuing corresponding system notices and alerts in case a potentially failure condition is detected for one or more of processors 102. Consistent with known PFA techniques, such monitoring may include detecting internal processor errors as manifested on specified error-reporting registers associated with a particular hardware unit or group of hardware units in the processor. In addition to its monitoring function, SM logic 106 performs predictive analysis in which the monitored register data is analyzed in real-time to detect degradation and potential failure of a unit. Such analysis generally entails monitoring the error indicators over time to detect either an abrupt change or that a specified threshold has been exceeded either of which may be indicative of a potentially failing or functionally degraded agent. Furthermore, and in accordance with an important feature of the depicted embodiment, SM logic 106 further includes logic enabling it to serve as a system management interrupt (SMI) requester responsive to a detected processor error.

Figure 2:
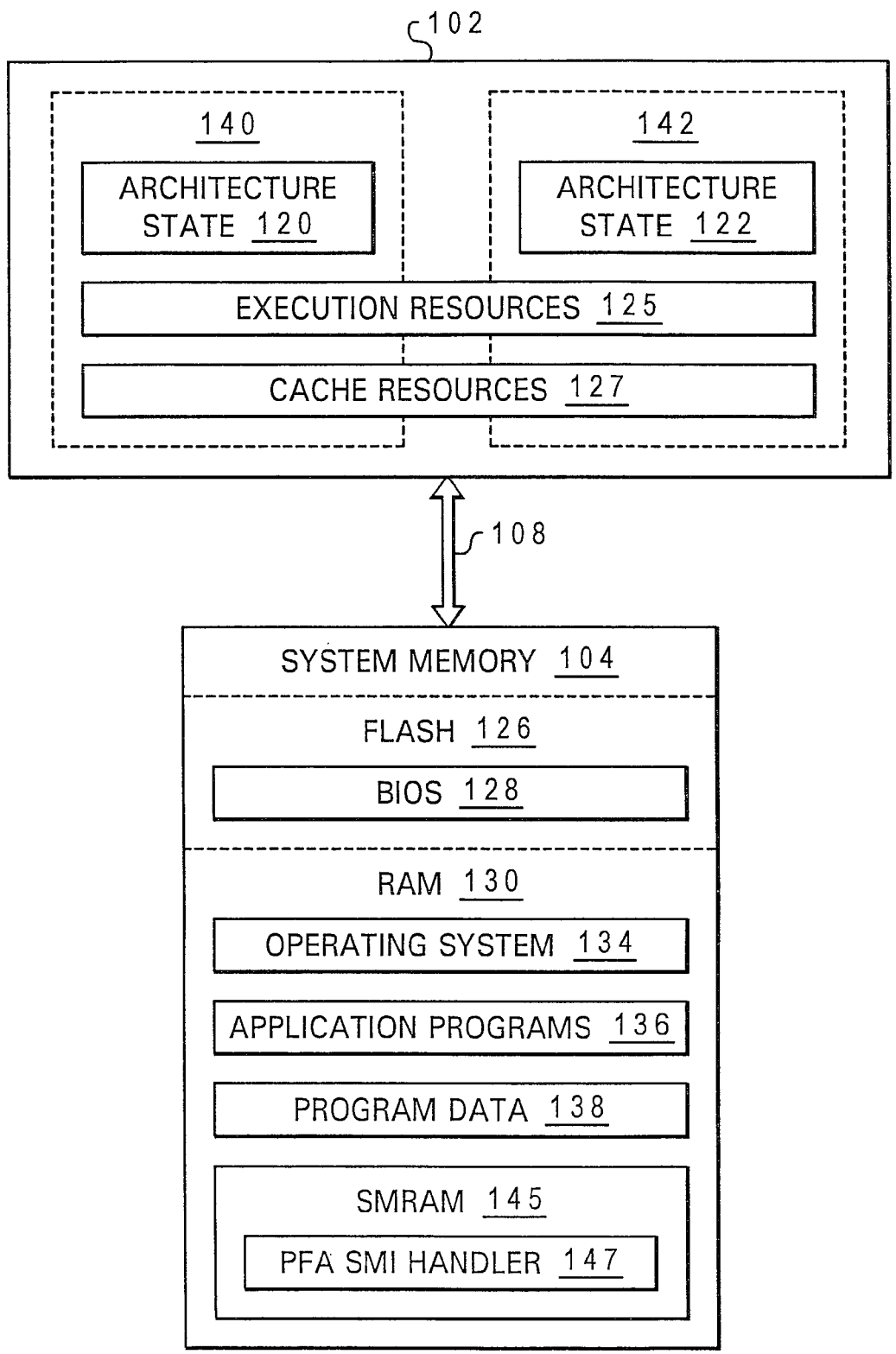
FIG. 2 is a block diagram illustrating a processor supporting multiple logical processors such as may be included within the data processing system shown in FIG. 1.

The symmetric multiple-processor architecture depicted in FIG. 1 includes hardware and software features enabling concurrent execution of multiple threads. Furthermore, and as depicted in FIG. 2, the processor architecture employed by data processing system 100 enables each of processors 102 to execute multiple threads concurrently using so-called "hardware multi-threading" or "hyper-threading." For example, Intel Corporation's Hyper-Threading (HT) technology enables a single processor to execute multiple threads concurrently, thereby effectively functioning as multiple physical processors. HT-enabled processors can manage incoming instructions from different software applications and continuously switch from one set of instructions to the other, without losing track of the state of each set of instructions. In this manner, HT technology complements symmetric multi-processing by enabling more threads to execute simultaneously per processor. As explained below with reference to FIGS. 2, 3 and 4 the present invention advantageously incorporates HT processing agents in the predictive processor recovery method described herein.

Referring to FIG. 2, there is depicted a block diagram illustrating an exemplary processor, such as one of processors 102, supporting multiple logical processors. Processor 102 supports two logical processors as one that supports, for example, HT technology. Processor 102 includes two architecture or operating states 120 and 122, resulting in processor 102 appearing to the system as two logical processors 140 and 142, respectively. While only two logical processors are depicted, those skilled in the art would recognize that the processor 102 may support more than two logical processors, with each having a respective architecture or operating state. The two logical processors 140 and 142 (referred to herein in the alternative as "hardware threads" or "hyper-threads") typically share a common set of execution resources 125, caches 127, system bus 108 and system memory 104. Processor 102 may schedule the threads in interleaved fashion depending on which of logical processors 140 and 142 is available.

As further depicted in FIG. 2, system memory 104 includes flash memory 126 and random access memory (RAM) 130. Flash memory 126 is an electrically erasable programmable read only memory (EEPROM) module and includes a basic input/output system (BIOS) 128, containing the basic routines that facilitate transfer of information between elements within data processing system 100, such as during start-up. A number of program modules may be stored in system drives (not depicted) and RAM 130, including an operating system 134, application program modules 136, and program data 138.

As noted above, the present invention leverages extant PFA techniques such as those deployed by SM processor 106 in conjunction with SMI functionality to provide a combined prediction and reporting mechanism combined with autonomic processor recovery. To this end, RAM 130 further includes a protected and specially designated system management RAM (SMRAM) address space 145. As is known in SM technology, SMRAM 145 is logically independent from the rest of system memory 104 in that it is only accessible in association with SMM in which one or more processors have received system management interrupts (SMI) requests. Specifically, SMRAM 145 contains SMI handler routines and, when a processor has entered SMM in response to an SMI request, the processor saves or dumps its operating state into the protected address space provided by SMRAM 145.

The multiple processing agents including processor cores 102 and associated hardware threads within data processing system 100 are initialized during system startup, typically as part of the BIOS system initialization. In the multi-core and multi-thread system environment depicted in FIGS. 1 and 2, it is generally the case that one more of the system-initialized processor agents (i.e. processor cores 102 and associated logical processors) remain unutilized. Specifically, processing load requirements or licensing restrictions will ordinarily result in several of the processor agents remaining in an idle state. The processor recovery method of the present invention combines the aforementioned PFA interrupt requester function with a specialized SMI interrupt handler 147 to enable a failing processor to be replaced in a manner that preserves current processor state data, is transparent to the operating system, and imposes minimal if any overall runtime processing disruption.

Figure 3:
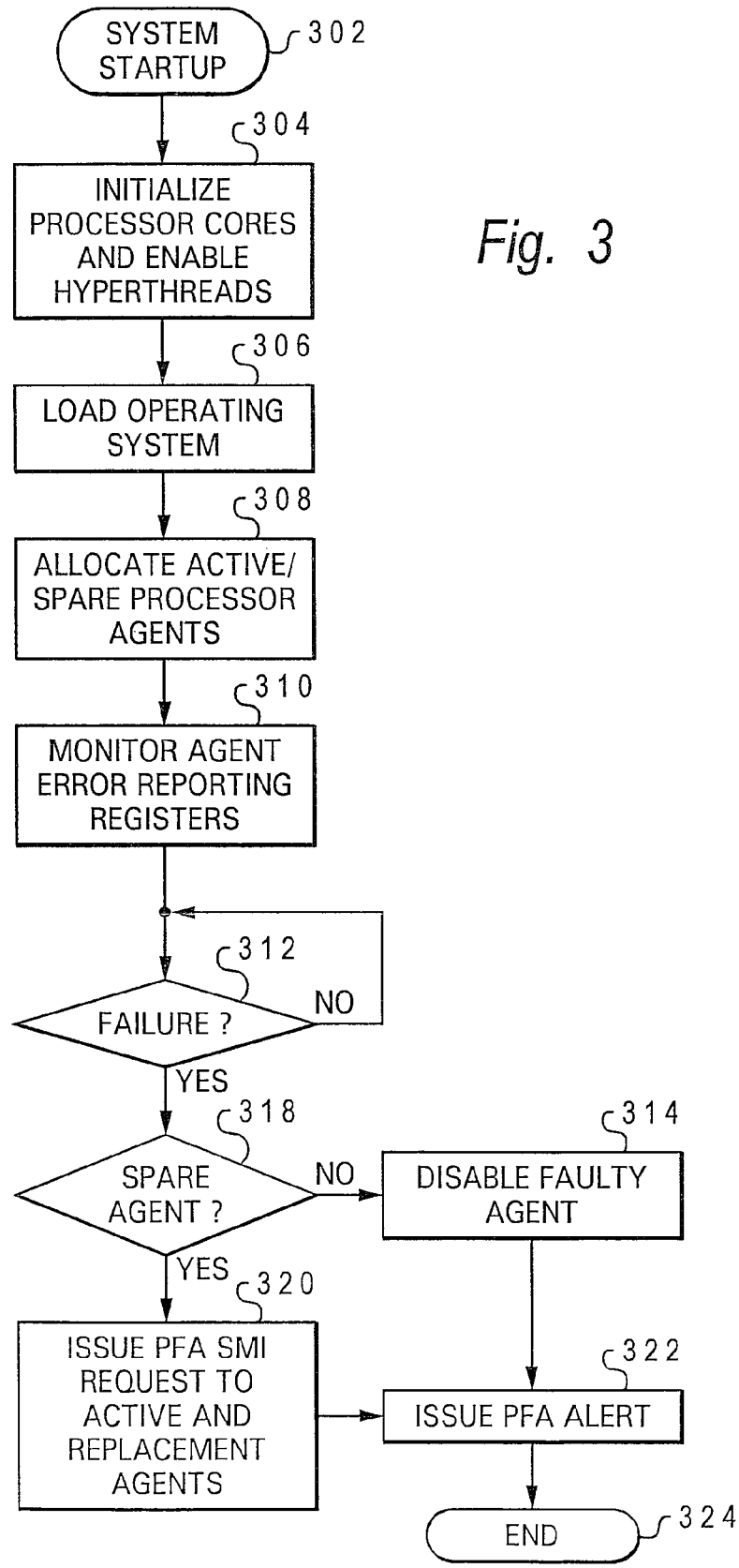
FIG. 3 is a high-level flow diagram depicting steps performed during the monitoring and error reporting phases of the processor recovery method of the present invention.

Referring to FIG. 3, there illustrated a high-level flow diagram depicting steps performed during the monitoring and error reporting phases of the processor recovery method in accordance with the present invention. The process begins as shown at step 302 with a system startup or boot sequence for data processing system 100. As part of the boot sequence, BIOS 128 initializes the multiple processor cores 102 and enables the hyper-threads in known manner as illustrated at step 304. Also as part of the boot sequence, the operating system 134 is loaded into system memory as depicted at step 306. As an additional step in the startup sequence shown at step 308, each of the initialized processor agents including both processor cores and hyper-threads are allocated by the system as either being available for runtime processing or as idle or otherwise unavailable, such as in accordance with operating system licensing requirements that limit the total number of available agents that may be simultaneously available for processing.

Following system startup and processor agent initialization and allocation, data processing system 100 commences run time processing. The present invention includes a processor agent monitor facility, such as SM processor 106 or an SMI handler routine in system BIOS 128 that monitors processor registers, such as agent-specific MSRs to detect a potential failure condition (step 310). As explained above with reference to FIG. 1, such monitoring preferably includes applying PFA techniques wherein results from error-reporting MSRs are compared with threshold levels to determine whether or not a given processor agent is at risk to fail. As shown at step 312 such PFA monitoring of the processor agents continues in a continuous or timed loop manner during system operation.

As illustrated at steps 312 and 318, responsive to the monitoring logic detecting a fail or likely fail condition in accordance with the PFA analysis of the MSR data of a particular agent (referred to herein alternatively as a "failed," "failing," or "faulty" agent), a determination is made of whether or not a suitable spare processor agent is available. The determination shown at step 318 preferably includes first determining if one or more processor agents have been system allocated as at step 308 as non-utilized agents or are otherwise idle. To distinguish from "active" processor agents (i.e. non-idle processors), such presently non-utilized or idle processor agents that are determined as prospective replacement agents are alternatively referred to generically as "available" such as an available processor, processor core or hardware thread. Assuming a set of one or more processor agents are available to serve as replacements, the inquiry at step 318 may further include determining which of the candidate replacements is a suitable replacement in terms of processing logistics such as memory sharing, core versus thread, etc.

Responsive to a lack of currently available spare and/or suitable agents, the faulty processor agent is disabled and/or a PFA alert is issued as depicted at steps 314 and 322. If a suitable replacement processor agent is available to replace the faulty agent, the SM processor 106 or equivalent SMI handler utility (not depicted) in BIOS 128 issues a PFA SMI request to either or both the active/faulty agent and the selected replacement agent as shown at steps 318 and 320. An SMI is a non-maskable interrupt (NMI) having a higher priority than standard NMIs and is typically utilized to perform system management functions independent of the processor operating mode. The monitoring and reporting process concludes as shown at steps 322 and 324 with the issuance of a PFA alert indicating the identity of the failed agent.

Figure 4:
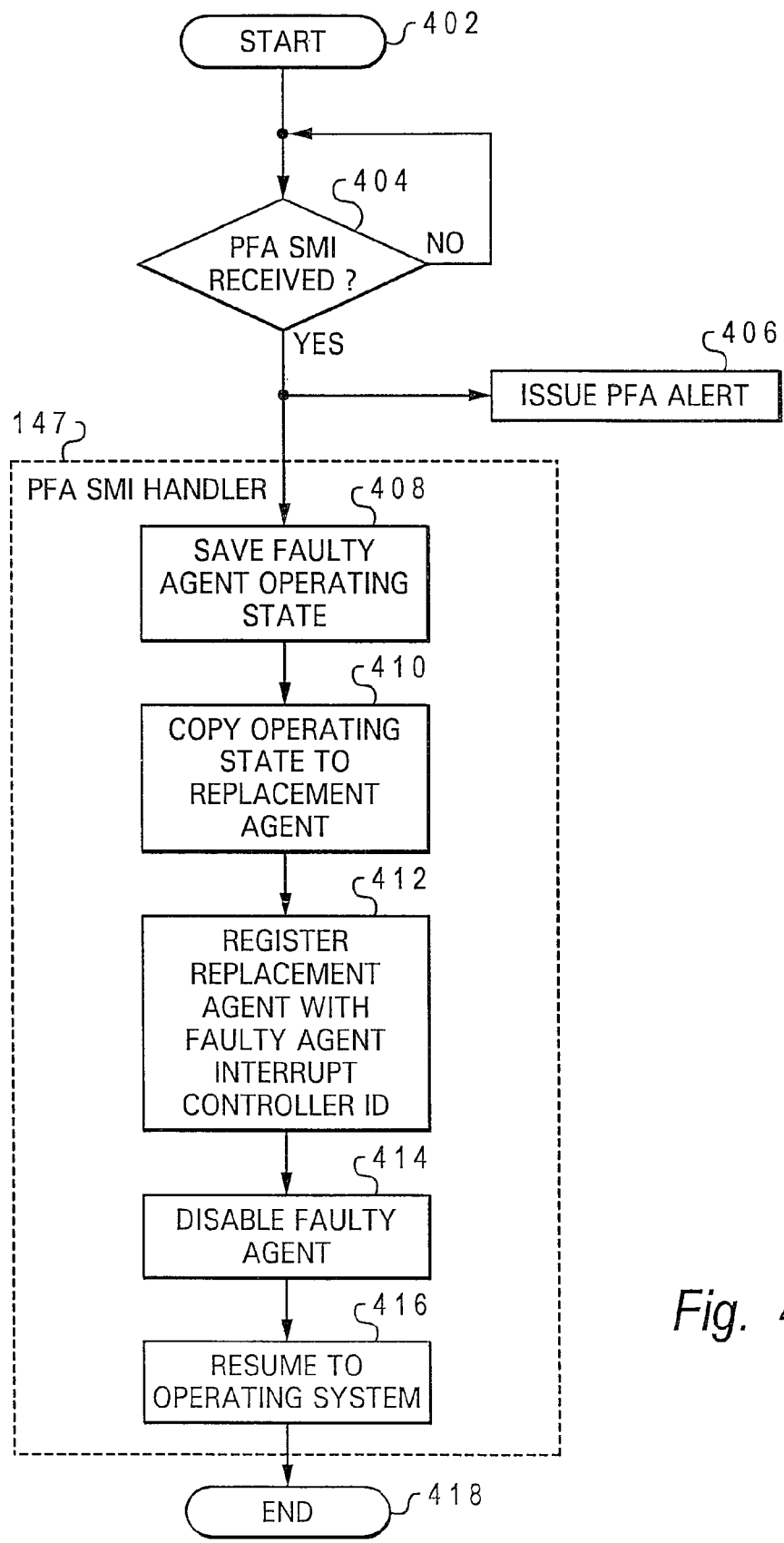
FIG. 4 is a high-level flow diagram illustrating steps performed during runtime processor recovery in accordance with a preferred embodiment of the present invention.

Referring to FIG. 4, there is depicted a high-level flow diagram illustrating runtime processor recovery steps performed responsive to the monitoring and reporting process in accordance with a preferred embodiment of the present invention. The process begins as shown at step 402 and proceeds to step 404 with a determination by an active processor agent and/or a selected replacement agent of whether or not a PFA SMI request has been received. Depending on the interrupt controller protocol being used, the PFA SMI may be sent to either or both of the faulty and replacement agents. Responsive to a PFA SMI being received, a PFA alert is issued (step 406) and both physical and/or logical processors enters system management mode (SMM) as within PFA SMI handler stage 147. SMM is well known in the art as one of several specified processor operating modes such as protected, real and virtual modes. As related to the reporting and recovery method of the present invention, a SMM provides electronic and program mechanisms by which processor operation can be interrupted and then resumed in a manner that is transparent to the operating system and application programs.

While in the PFA SMI handler stage 147, the operating or architectural state of the faulty processor agent is saved in SMRAM as illustrated at step 408. Next, as depicted at step 410 the saved operating state is copied to the replacement agent. Furthermore, to enable the replacement agent to seamlessly resume the processing thread handled by the faulty agent prior to entering SMM, the interrupt controller ID of the faulty agent is registered to the replacement agent (step 412) and the faulty agent is disabled. Assuming the host multiprocessing system employs an SMP protocol such as Intel Corporation's Advanced Programming Interrupt Control (APIC) or the more recently developed xAPIC, step 412 entails assigning the faulty agent's APIC ID to the replacement agent. Having assumed the state and interrupt controller ID from the faulty agent, the replacement physical or logic processor agent then exits the SMM by executing a RSM (resume) instruction (step 416) and operating system execution continues before the recovery process ends (step 418).

It should be noted that the above-described steps 408 through 416 are preferably performed in an SMRAM space such as SMRAM 145. While SMRAM 145 is depicted as physically incorporated within system memory 104, in an alternative embodiment, the object SMRAM may be provided on one or more physical processor units. In either case, the SMRAM address space is logically separate from the rest of system memory 104 to ensure the software routines, such as PFA SMI handler routine 147, do not overlap or in any way conflict with the operating system or application programs.

In the foregoing manner, the present invention enables unobtrusive (i.e. OS transparent) runtime monitoring and reporting of internal processor errors and furthermore provides a similarly transparent and mechanism for seamlessly replacing a faulty processor agent in a manner that preserves the operating state of the agent and avoids data loss and system interruption. Furthermore, such transparency makes the reporting and recovery phases involving logical processors (e.g. hyper-threads) equally applicable to multiprocessor systems employing non-hyperthread aware operating systems.

While the invention has been particularly shown and described with reference to a preferred embodiment, it will be understood by those skilled in the art that various changes in form and detail may be made therein without departing from the spirit and scope of the invention.

What is claimed is:

1. In a multiprocessor system having an operating system and supporting a system management mode that is transparent to the operating system, a processor recovery system comprising:

system management processing means responsive to detecting a faulty processor agent for:
        issuing a system management interrupt (SMI) request;
        operating the faulty processor agent and a replacement processor agent in the system management mode in response to said SMI request, and while operating the faulty processor agent and the replacement processor agent in system management mode:
            saving an operating state of said faulty processor agent to system management memory that is accessible by said faulty processor agent only when said faulty processor agent is operating in system management mode;
            copying the saved operating state to the replacement processor agent; and
            re-assigning an interrupt control ID from the faulty processor agent to the replacement processor agent; and
    system management processing means for resuming operating system processing from the system management mode utilizing the replacement agent.

2. The processor recovery system of claim 1, wherein said system management processing means for copying the saved operating state to the replacement processor agent comprises a system management interrupt (SMI) handler routine.

3. The processor recovery system of claim 1, further comprising a system management processor for monitoring one or more internal error-reporting registers associated with the faulty processor agent.

4. The processor recovery system of claim 3, wherein said system management logic includes predictive failure analysis logic.

5. In a multiprocessor system having an operating system and supporting a system management mode that is transparent to the operating system, a non-volatile storage medium having encoded thereon computer-executable instructions for recovering from an internal processor error, said computer-executable instructions adapted for performing a method comprising:

responsive to detecting a faulty processor agent:

issuing a system management interrupt (SMI) request;

operating the faulty processor agent and a replacement processor agent in the system management mode in response to said SMI request, and while operating the faulty processor agent and the replacement processor agent in system management mode:

saving an operating state of said faulty processor agent to system management memory that is accessible by said faulty processor agent only when said faulty processor agent is operating in system management mode;

copying the saved operating state to the replacement processor agent; and re-assigning an interrupt control ID from the faulty processor agent to the replacement processor agent; and resuming operating system processing from the system management mode utilizing the replacement agent.

6. The non-volatile storage medium of claim 5, wherein said detecting a faulty processor agent comprises monitoring one or more internal error-reporting registers associated with the faulty processor agent.

7. The non-volatile storage medium of claim 5, wherein said method further comprises determining availability of one or more replacement agents within the multiprocessor system.

8. The non-volatile storage medium of claim 5, said issuing an SMI request further comprising issuing an SMI request to the faulty processor agent.

* * * * *